Sept. 23, 1924.
G. B. CLAUSON
1,509,638
CLUTCH OPERATING ATTACHMENT FOR TRACTORS
Filed March 11, 1922
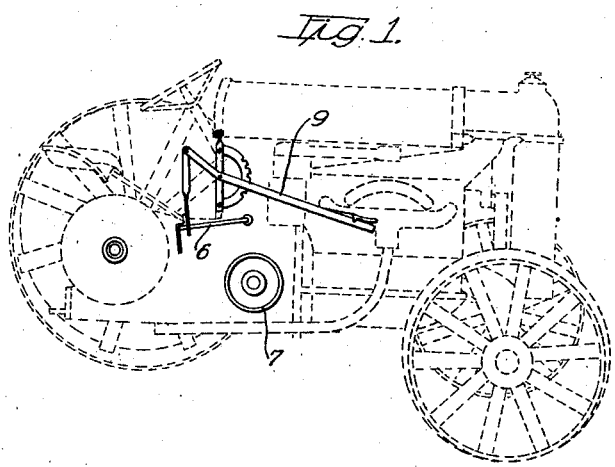
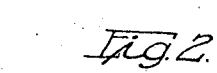
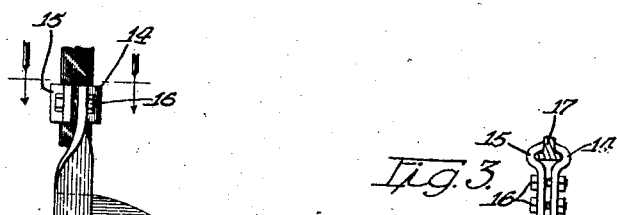
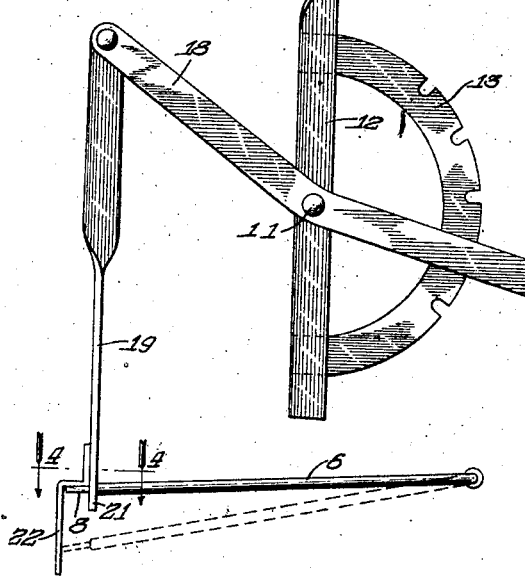
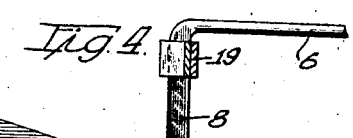
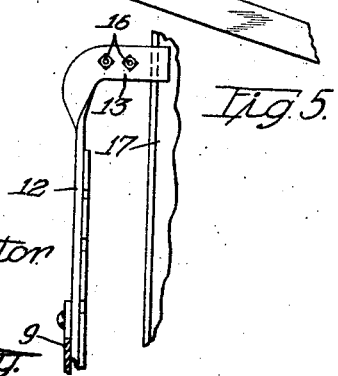
Gustave B. Clauson
Ira J. Wilson
Inventor
By
Atty.

Patented Sept. 23, 1924.

1,509,638

UNITED STATES PATENT OFFICE.

GUSTAVE B. CLAUSON, OF WINNEBAGO, ILLINOIS.

CLUTCH-OPERATING ATTACHMENT FOR TRACTORS.

Application filed March 11, 1922. Serial No. 543,114.

*To all whom it may concern:*

Be it known that I, GUSTAVE B. CLAUSON, a citizen of the United States, residing at Winnebago, in the county of Winnebago and State of Illinois, have invented certain new and useful Improvements in Clutch-Operating Attachments for Tractors, of which the following is a specification.

This invention relates to tractors of that type, such as the Fordson tractor, having a foot pedal for operating the clutch, and has more particular reference to an attachment providing an additional means for operating said clutch pedal.

In this type of tractor, a belt pulley is driven from the transmission drive shaft when the clutch pedal is depressed for releasing the clutch. When using the belt pulley, the belt is sometimes thrown off, due to excessive load and other reasons, with the result that the engine races, although it is to some degree controlled by the governor. In this event it is desired to be able to instantly disengage the clutch and to do so it has heretofore been necessary for the operator to mount the tractor and depress the clutch pedal. Furthermore, when starting the tractor with the belt coupled to the load, it is sometimes difficult to pick up the load without stalling the engine or throwing the belt, due to need for proper adjustment of the fuel mixture to accommodate the load or to the difficulty to picking up a heavy load. Under these circumstances, it is desired to be able to regulate the mixture while picking up the load and also to slip the clutch for picking up the load gradually and preventing the motor from stalling; and it is further desired that both of these operations may be performed by the operator from a common position.

The object of the present invention is, therefore, to improve the conditions attendant upon operating a belt pulley in a tractor of the Fordson type by the provision of an attachment, whereby the clutch pedal may be operated by hand from the fuel intake side of the tractor, thereby enabling the operator standing at the side of the tractor to operate the clutch at will without mounting the tractor.

Another object is to provide a hand lever attachment especially adapted for Fordson tractors for operating the clutch pedal from one side of the tractor, which attachment does not interfere with the normal foot operation of the clutch pedal from the driver's seat.

My invention also contemplates the provision of an attachment of the character described, which may be easily applied to a tractor and will serve in a practical and satisfactory manner the purposes intended.

Referring to the drawing,—

Figure 1 shows the application to a Fordson tractor, a clutch pedal attachment embodying my invention;

Fig. 2 is an enlarged side view of the attachment;

Figs. 3 and 4 are detail sections taken on the lines 3—3 and 4—4, respectively, of Fig. 2; and Fig. 5 is a fragmentary front view showing the mounting of the lever-supporting bracket to the tractor frame.

In the present example, I have shown only such parts of a Fordson tractor as are necessary for an understanding of the invention. In Fig. 1, the near drive wheel is removed and the clutch pedal 6 and power or belt pulley 7 is shown in full lines. The clutch pedal, pivoted at its forward end, has an outwardly turned foot stirrup 8 at its rear. end adapted to be depressed for releasing the clutch. My invention contemplates the provision of a hand lever such as 9, detachably mounted on the tractor in position to be operated from the fuel intake side thereof and so connected with the clutch pedal as to operate the same for releasing and engaging the clutch, yet permitting independent operation of said pedal from the driver's seat. In the present instance, I have provided a hand lever 9 pivotally mounted at 11 on a bracket 12 which carries a notched sector 13 and is adapted to be detachably secured to the tractor frame. In this instance, the bracket 12 is in the form of a strip of strap iron bent laterally at its upper end to provide a jaw 14, which with a complemental jaw 15, is adapted to be clamped by bolts 16 to the dash frame 17. The hand lever has the usual latch connection with the notched sector 13. To the rear end 18 of the hand lever is pivotally suspended a thrust link 19 having a forked lower end straddling the pedal stirrup 8. In the present instance, said yoke is formed by the parts 21 and 22, the latter of which extends substantially below the former and serves to prevent operative displacement of the link 19 from the pedal stirrup when the latter is operated independently of the hand lever.

In the full line position of the parts shown, the hand lever has been moved to and set in a position which allows the clutch pedal 6 to assume the uppermost or clutch engaging position. By releasing the hand lever from the segment 13 and swinging it upwardly, the clutch pedal will be depressed for releasing the clutch as will be obvious.

In operation, the operator who usually stands at one side of the tractor while it is being used for power pulley work, is in a position to give attention to the tractor mechanism and at the same time to be able to instantly disengage the clutch if occasion should require. It will also be manifest that by reason of this attachment the operator when starting to pick up the pulley load, may at the same time regulate the fuel supply to accommodate the load and ease or slip the clutch so that the load will be picked up gradually.

It is believed that the foregoing conveys a clear understanding of the objects prefaced above, and while I have illustrated but a working embodiment, it should be understood that considerable change might be made in details of construction without departing from the spirit and scope of the invention as expressed in the appended claim.

I claim:

In a tractor, in combination with the clutch pedal and a frame part of the tractor, a clutch-operating attachment comprising a bracket having a notched sector and shaped to provide a jaw adapted to fit against one side of said frame part and to support the bracket from an overhead position in operative relation to the clutch pedal, a jaw complemental to the first jaw and adapted to fit against the opposite side of said frame part, means for clamping said jaws together for detachably securing the bracket to the interposed frame part, a lever pivoted on the bracket and having a latch connection at its operating end with the notched portion of the sector, and means connecting the operated end of the lever with the clutch pedal so as to operate the latter for disengaging the clutch by movement of the lever in one direction and permitting the clutch pedal to be independently operated for disengaging the clutch when said lever is in the clutch-engaged position.

GUSTAVE B. CLAUSON.